(12) United States Patent
Dickins et al.

(10) Patent No.: US 9,866,681 B2
(45) Date of Patent: Jan. 9, 2018

(54) AUDIO BURST COLLISION RESOLUTION

(71) Applicant: DOLBY LABORATORIES LICENSING CORPORATION, San Francisco, CA (US)

(72) Inventors: Glenn N. Dickins, Como (AU); Brendon Costa, Coniston (AU); James Zealey, Dapto (AU); Jeremy Pascal Brun, Wollstonecraft (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 38 days.

(21) Appl. No.: 14/653,191

(22) PCT Filed: Dec. 16, 2013

(86) PCT No.: PCT/US2013/075458
§ 371 (c)(1),
(2) Date: Jun. 17, 2015

(87) PCT Pub. No.: WO2014/099809
PCT Pub. Date: Jun. 26, 2014

(65) Prior Publication Data
US 2015/0341498 A1 Nov. 26, 2015

Related U.S. Application Data

(60) Provisional application No. 61/745,343, filed on Dec. 21, 2012.

(51) Int. Cl.
*H04L 12/16* (2006.01)
*H04M 3/22* (2006.01)
(Continued)

(52) U.S. Cl.
CPC ..... *H04M 3/2227* (2013.01); *H04M 3/42187* (2013.01); *H04M 3/568* (2013.01); *G10L 25/78* (2013.01)

(58) Field of Classification Search
None
See application file for complete search history.

(56) References Cited

U.S. PATENT DOCUMENTS

| 4,271,502 A | 6/1981 | Goutmann |
| 4,479,211 A | 10/1984 | Bass |

(Continued)

FOREIGN PATENT DOCUMENTS

| JP | S61-192154 | 8/1986 |
| JP | H08-274888 | 10/1996 |

(Continued)

OTHER PUBLICATIONS

Abramson, Norman, "The Aloha System—Another Alternative for Computer Communications," Fall Joint Computer Conference 1970. AFIPS, pp. 281-285.

(Continued)

*Primary Examiner* — Nicholas Sloms

(57) ABSTRACT

In an conferencing system in which a plurality of communication devices electronically connect respective participants to one another, a method for mitigating the effects of substantially concurrent audio bursts from two or more of the participants includes identifying a priority attribute associated with each of multiple substantially concurrent audio bursts, comparing the identified priority attributes, and electronically suppressing at least one audio burst as a function of the comparison.

20 Claims, 6 Drawing Sheets

(51) Int. Cl.
*H04M 3/42* (2006.01)
*H04M 3/56* (2006.01)
*G10L 25/78* (2013.01)

(56) References Cited

U.S. PATENT DOCUMENTS

| | | | |
|---|---|---|---|
| 6,771,759 B2 | 8/2004 | Mark | |
| 6,807,563 B1 | 10/2004 | Christofferson | |
| 7,213,050 B1 | 5/2007 | Shmuel Shaffer | |
| 7,650,142 B2 | 1/2010 | Longman | |
| 8,010,144 B2 | 8/2011 | Luft | |
| 8,069,465 B1 | 11/2011 | Bartholomay | |
| 8,249,235 B2 | 8/2012 | Kim | |
| 2002/0181686 A1* | 12/2002 | Howard | H04L 29/06027 379/202.01 |
| 2008/0144794 A1* | 6/2008 | Gardner | H04L 65/403 379/202.01 |
| 2008/0310398 A1 | 12/2008 | Jain | |
| 2009/0013052 A1* | 1/2009 | Robarts | G06F 17/30867 709/206 |
| 2011/0064079 A1 | 3/2011 | Lim | |
| 2012/0140949 A1 | 6/2012 | Chen | |
| 2013/0144603 A1* | 6/2013 | Lord | H04L 12/1831 704/9 |
| 2013/0226557 A1* | 8/2013 | Uszkoreit | G06F 17/289 704/3 |

FOREIGN PATENT DOCUMENTS

| | | |
|---|---|---|
| JP | 2000-236330 | 8/2000 |
| WO | 2012/072276 | 6/2012 |
| WO | 2012/120339 | 9/2012 |

OTHER PUBLICATIONS

"One-Way Transmission Time-Report on the Mmpact of Mouth to Ear Delay on the Quality of Voice," ITU-T Recommendation G.114, Jan. 2003, pp. 1-18.

Kuo, F. F., "The ALOHA System," ACM Computer Communication Review, 1995, pp. 63-66.

Ziegler, C. et al "Implementation Mechanisms for Packet Switched Voice Conferencing" IEEE Journal on Selected Areas in Communication, Jun. 1989, vol. 7, Issue 5, pp. 698-706.

Xu, Xun et al "PASS: Peer-Aware Silence Suppression for Internet Voice Conferences" IEEE International Conference on Multimedia and Expo, Jul. 9-12, 2006, pp. 2149-2152.

* cited by examiner

AUDIO BURST COLLISION RESOLUTION

CROSS-REFERENCE TO RELATED APPLICATIONS

This application claims priority to U.S. Provisional Patent Application No. 61/745,343 filed 21 Dec. 2012, which is hereby incorporated by reference in its entirety.

TECHNICAL FIELD

The present disclosure relates generally to conferencing systems, and more particularly, to the resolution of collisions of audio bursts from multiple speakers.

BACKGROUND

In voice conferencing systems, where the transport of audio or voice is mediated other than by a direct proximate acoustic coupling, the participants will experience an increased delay in round trip communication. Typically, in telecommunication systems, this can be of the order of 200-500 ms in each direction, and is known as 'mouth to ear' delay. This is known to have an impact on communications and functional use of such systems. ITU (ITU-T G.114 2003) sets out details of the observed impact, under different functional activities, of increased link latency. Even in simple one-to-one mediated conversations, the latency can have a substantial impact. In some cases, where long distance or adverse network conditions are experienced, typical latencies can exceed the critical threshold of 400 ms set out in ITU-T G.114 2003. For example, when using an IP network, typical latencies across the Atlantic network may be 200 ms, and in addition to this time there will be necessary and additional system delays associated with buffering, central servers, jitter buffers, software systems at the end points and hardware or low level audio subsystems. Even for a well-designed system, these additional latencies can add up to 100 ms plus whatever time is required for the desired robustness to network jitter.

One of the main problems that is manifest from this latency, is the increased probability that both parties will commence speaking within the one-way delay time, and then the time taken for this to be realized and then for one or both parties to back off. This problem has an impact on 'natural turn-taking' and causes delays, stutter, and inefficiency in the communications flow. This problem can be understood with reference to FIG. 1, which diagrammatically illustrates the negative consequences of latency on conversational flow in a three-party situation.

As seen from the upper portion of FIG. 1, parties A, B, and C are participants in a video or telephone conference that is managed by a server 102. Each of the parties A, B, and C has a two-way communication (video and/or voice) channel open with server 102 during the conference, with communications between all the parties thus passing by way of the server. The server 102 thus sends all incoming audio out as would be expected of a single acoustic space.

The lower portion of FIG. 1 depicts a timeline in which an example of transmissions (TX) and receptions (RX) by the parties A, B, and C, and the server S are indicated. We see that A begins a transmission at time 104 which, due to the latency, is not received by B until a time 106. In the meantime, not yet aware of A's transmission, B begins a conflicting transmission at time 108. B discovers the conflict when B first receives A's transmission, at time 106, and ceases transmitting at 110 in response. Similarly, A only discovers the conflict at 112, when B's transmissions first reaches A because of the latency. At that time, 112, A also ceases transmitting. Both parties pause, at 114a and 114b, and then, unhappily, begin re-transmission at substantially the same time, 116a and 116b, starting another collision cycle. For completion, the reception of A's and B's transmissions by third party C are shown in the timeline, at 118, as are A's and B's transmissions, as emanating from the server S, at 120.

This collision-pause-re-collision problem also extends, in a more technical sense, to the use of a single media by multiple packetized data communications networks separated by some reasonable physical delay. Whilst the delays associated are much lower, with small packets and moderate-sized electrical or RF networks, the principle is the same. When a collision occurs, both parties must back off and attempt a retransmit in order to achieve reliable communications. A problem arises when the time an endpoint waits before trying again is highly correlated with the time for the other end. This causes repeated collisions. A solution for this is known as the ALOHA protocol, in which the end points wait a random interval before attempting to send again. This lowers the chance of a subsequent collision. If the end points share the same random distribution of waiting times (typically uniform distribution to minimize the chance of repeated collisions), then this system is fair and moderately efficient without requiring any arbitration.

In both the communications networking, and voice communications field, this problem is exacerbated by a larger number of parties to the conference. The probability of collision scales with the number of participants wishing to communicate. With a voice conference this becomes an almost certainty at some point when the latency and conference size increase, especially since most situations for potential wider response are precipitated by a request or closing from an active endpoint. Attempts to secure the single combined voice conference channel are highly correlated in time among the parties. While a protocol such as ALOHA could be adopted by users, it is human nature for some parties to abuse this by attempting to transmit again sooner. An alternative is an analogy of the structured turn taking approach. This can be evidenced on emergency services radio communications with a brief request including a priority code always transmitted as a first request to obtain the channel. A central point mediates access to the channel. While this is fair and practical, it does lower overall communications bandwidth.

Given these problems associated with communications channel latency, it is desirable to ameliorate collisions and to assist efficient and fair turn-taking. It is also desirable to improve the time to resolve collisions and achieve improved fairness without requiring an a priori agreed back-off strategy, or a token mechanism. It is further desirable to reduce the impact of collisions without permitting abuse by one or more parties, or encouraging race escalation or forced conversation entry, or otherwise negatively impacting the flow of conversation and channel efficiency when there is only a small subset of parties wishing to contribute.

OVERVIEW

As described herein, in an conferencing system in which a plurality of communication devices electronically connect respective participants to one another, a method for mitigating the effects of substantially concurrent audio bursts from two or more of the participants, includes identifying a priority attribute associated with each of multiple substantially concurrent audio bursts, comparing the identified priority attributes, and electronically suppressing at least one audio burst as a function of the comparison.

Also as described herein, a conferencing system operable to mitigate the effects of two or more substantially concurrent audio bursts includes a concurrency detector operable to determine substantial concurrency of two or more audio bursts, an attribute extractor operable to extract priority attributes from substantially concurrent audio bursts, a comparator operable to compare extracted priority attributes, and a suppressor operable to suppress at least one audio burst as a function of the comparison.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a conferencing system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The term "exemplary" is used exclusively herein to mean "serving as an example, instance or illustration." Any embodiment described herein as "exemplary" is not necessarily to be construed as preferred or advantageous over other embodiments.

Figure 1:
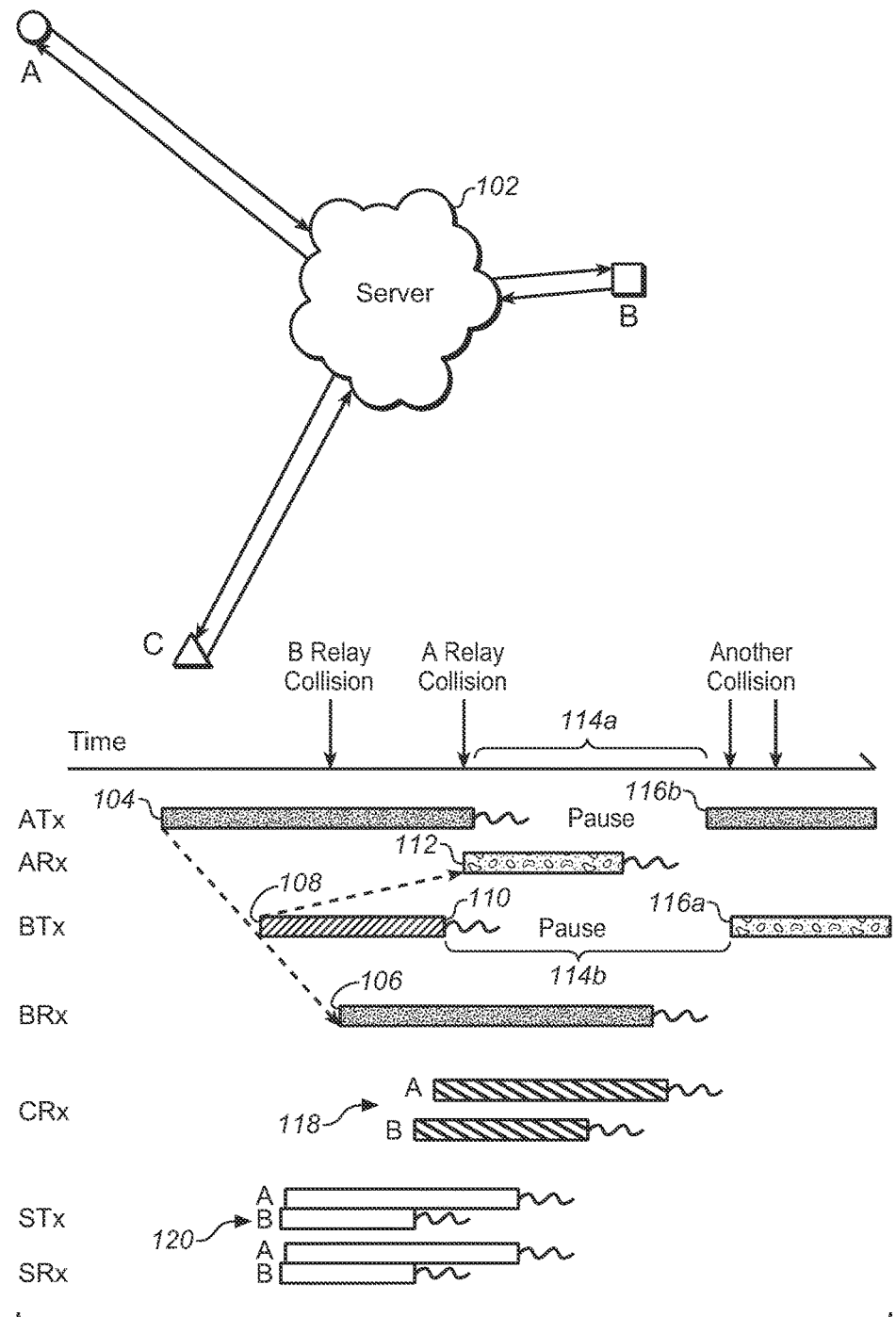
FIG. 1 is a diagrammatic illustration of a conventional conferencing system and associated timeline.
Figure 2:
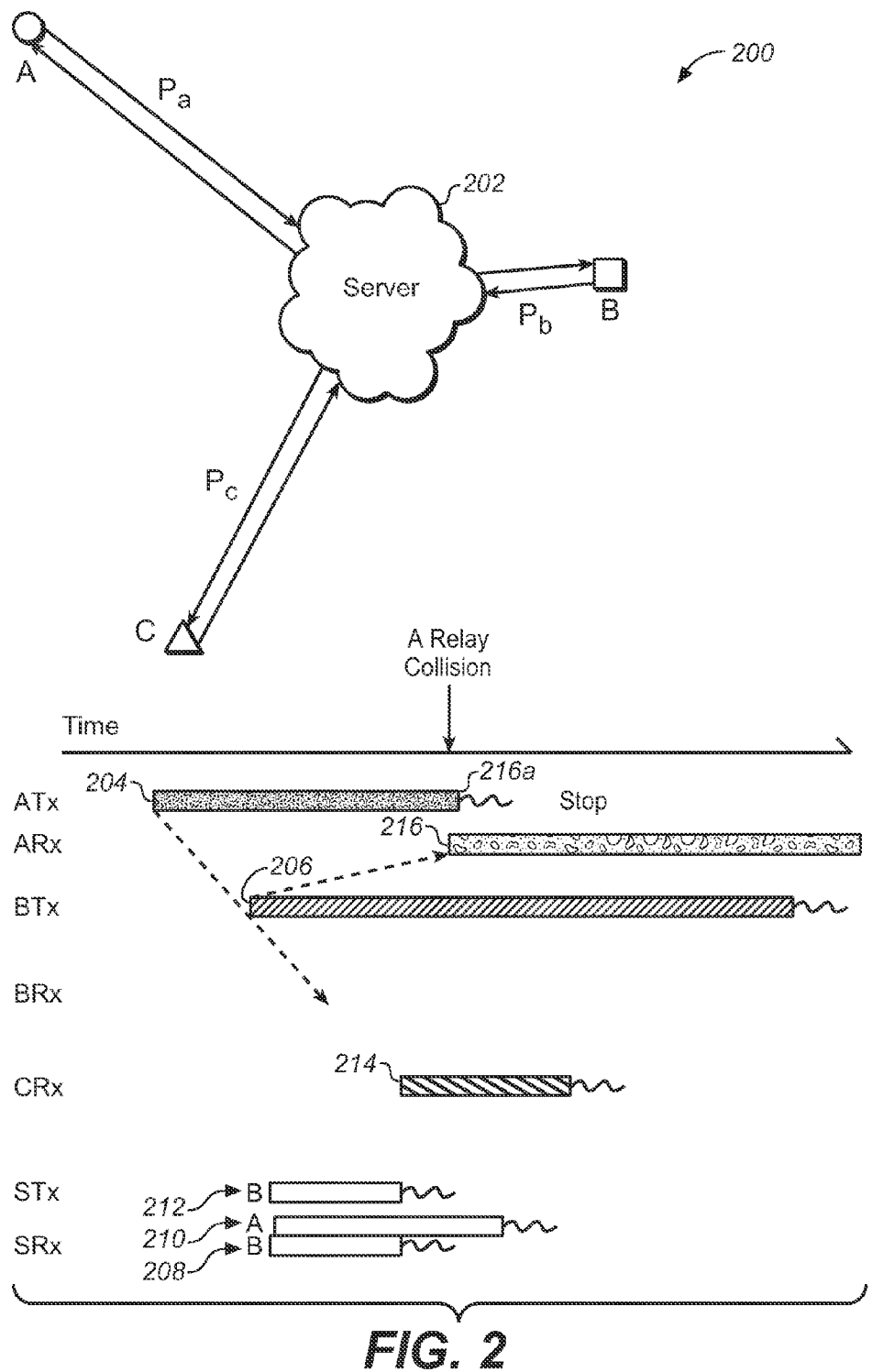
FIG. 2 is a diagrammatic illustration depicting a blocking approach in a conference system in accordance with certain embodiments.

FIG. 2 is a schematic diagram illustrating a blocking approach that can be taken in a conferencing system 200 to reduce communications collisions in accordance with certain embodiments. While described with reference to audio collisions in a telephone or video conference setting, it will be appreciated that the concept extends to other communications settings for which multiple parties or entities contend for a common communications channel and therefore have a need to avoid collisions caused by their concurrent transmissions and re-transmissions. For example, the solution extends to situations in which multiple packetized data communications networks separated by some reasonable physical (and time) delay contend for a single media. While in such a case the delays may be much shorter than in video or audio conferencing, with small packets and moderate-sized electrical or RF networks, the principles are substantially the same. When a collision occurs, both parties must typically back off and attempt a retransmit in order to achieve reliable communications.

In FIG. 2, a server 202 is depicted in two-way communication with each of parties A, B, and C (more or less parties are possible), with transmissions to or from each party passing through the server. Each party in conferencing system 200 is linked to the server 202 by way of a communication device (not shown) such as a landline telephone, a mobile telephone, smart phone, laptop or desktop computer, tablet, or any other device, wired or wireless, known to provide similar two-way communication capability. The parties can be at geographically different locations. The communication paths Pa, Pb and Pc between the parties and the server 202 can include one or more wired or wireless networks (not shown), such as a POTS (plain old telephone service) network, cellular network, LAN (local area network), WLAN (wireless local area network), WAN (wide area network), metropolitan area network, Internet, cable, satellite, and the like. With each path is associated a path or link latency that is a function of several factors, including the length of the path, the type and amount of equipment used, the networks traversed, congestion, and environmental conditions. The server 202 in certain embodiments can include one or more processing devices or computers (with associated support devices such as data storage) that are suitably linked together; or it can include one or more processes, for example in the form software or firmware modules, that are run on one or more such devices or computers; or it can include a combination of such devices and processes. In some embodiments, further detailed below, the server, in its centralized form, can be dispensed with altogether, and the functionalities described herein can be distributed over the communication devices of the parties A, B and C. In some embodiments, a hybrid solution is utilized, in which some functionalities are performed by the server, while others are distributed over various communication devices at the party locations. In certain embodiments, the concept or implementation of a server may include distributed computing resources and software instances across a networked infrastructure. This may include separate server hardware that are proximate and distribute the processing tasks and load, and/or alternatively separate server hardware that are not proximate and distributed to optimize aspects of the latency and quality of service offered to the conference participants. In either case, the selective modification of certain streams to prevent or ameliorate perceived collisions can also be distributed across the set of servers. In one example, there may be some proxy or point of first contact between a particular endpoint and the set of servers. The information required to suppress or pass certain channels may exist at this proxy for the attached endpoint and in this way the processes described herein are implemented using server points at the edge of the distributed or 'cloud' server infrastructure. Additionally, more complex aspects of information-sharing and system function control known in the art of distributed server design may be employed to perform at least some or all of the functions indicated in this disclosure and in some embodiments assigned to a 'server'. It is therefore noted that the use of the term 'server' should generally be understood to encompass the ideas across all of a local server instance to at least one client, a distant or central server instance, and/or a set of distributed server instances operating collectively to perform the server related or central operations of the conference.

Generally, in the blocking approach of FIG. 2, in a potential collision, server 202 makes a determination as to which of multiple, colliding parties is to be subverted, in favor of one or more other parties. The communication, or audio burst, from the subverted party is then either blocked completely or attenuated with respect to one or more of the other parties. More generally, any suitable form of modification of a feature of the subverted party's transmission may be implemented, such as altering the pitch of the subverted speaker, replacing the voice of the subverted speaker with an artificially generated sound, filtering or amplifying or otherwise manipulating certain frequencies of the voice, introducing additional delay or latency, or selectively spatially positioning the voice, for example, behind the listeners. Such alteration, or a combination of such alterations, may be generally referred to herein as suppression for convenience only, with the understanding that the other alterations are encompassed within the definition of that term. In certain embodiments, the transmission or audio burst of the prevailing party, and/or additional parties, can be enhanced or emphasized, in addition to or in lieu of the suppression of the subverted party. Enhancement can take the form of increasing the gain or loudness of the transmission, spatially shifting its location in the audio scene, for example, to a position of greater prominence such as the center, or any combination of such measures. In this sense, suppressing one party may be merely by way of enhancing a different party. Thus a party may be suppressed without his/her communication being altered in any way; rather, the communication of one or more party's audio bursts would instead be enhanced, by increasing gain or loudness, spatially shifting, or the like. And of course a combination of subverting one party while enhancing another is contemplated and falls within this broad definition of suppressing.

The transmission from the subverted party may be suppressed to the perception of only a selected number of other parties, and not suppressed to the perception of other parties. If the subverted party is A, for example, the blocking of A's transmission may be with respect to B only, in which case B does not receive or hear A's communication (complete blocking), or receives an attenuated version of the communication (partial blocking), while C receives A's transmission in its original, unaltered form. The blocking versus attenuation can be performed selectively, with some parties being blocked from receiving the subverted party's transmission, while others receive an attenuated version of it, while others still receive it unaffected. Moreover, this selective blocking can be performed and varied dynamically in the course of a conversation or teleconference session. It can be used to manipulate the conversation, either automatically through server-directed rules, or manually by one or more users or participants, in order to promote some participants and subvert others.

Returning to FIG. 2, a potential collision is established when at 204, A begins a transmission, and then at 206, B begins a subsequent transmission. For purposes of this discussion, these transmissions, or audio bursts, are considered to be substantially concurrent, even though they begin at slightly different times, and even though the duration of their overlap may or may not be brief. From the perspective of the server, at SRx, B's transmission is received, at 208, slightly ahead of A's transmission, at 210. Such an inversion may occur due to different latencies in A's path versus B's path in the conferencing system 200, attributable to different path lengths, different equipment, different conditions, and the like, as previously explained.

In some embodiments, because B's transmission arrived at the server first, the server only releases B's transmission to C, at 212 (STx), while blocking A's transmission from C. This is evident to C, shown receiving only B's transmission, at 214. In embodiments in which other parties (D, E, F, . . . ) are involved, A's transmission may be selectively suppressed (for example, blocked or attenuated) with respect to some or all of these other parties, depending on the desired outcome.

At 216, A receives B's transmission, perceives a collision with his/her own transmission, and ceases transmitting (216a). B, on the other hand, is not aware of any collision because A's conflicting transmission was withheld by the server. B continues to transmit, while A, having become aware of the collision (or at least sensed that no one was receiving his/her transmissions), ceases to transmit. In this manner, the collision is resolved in B's favor, without a second collision.

Figure 3:
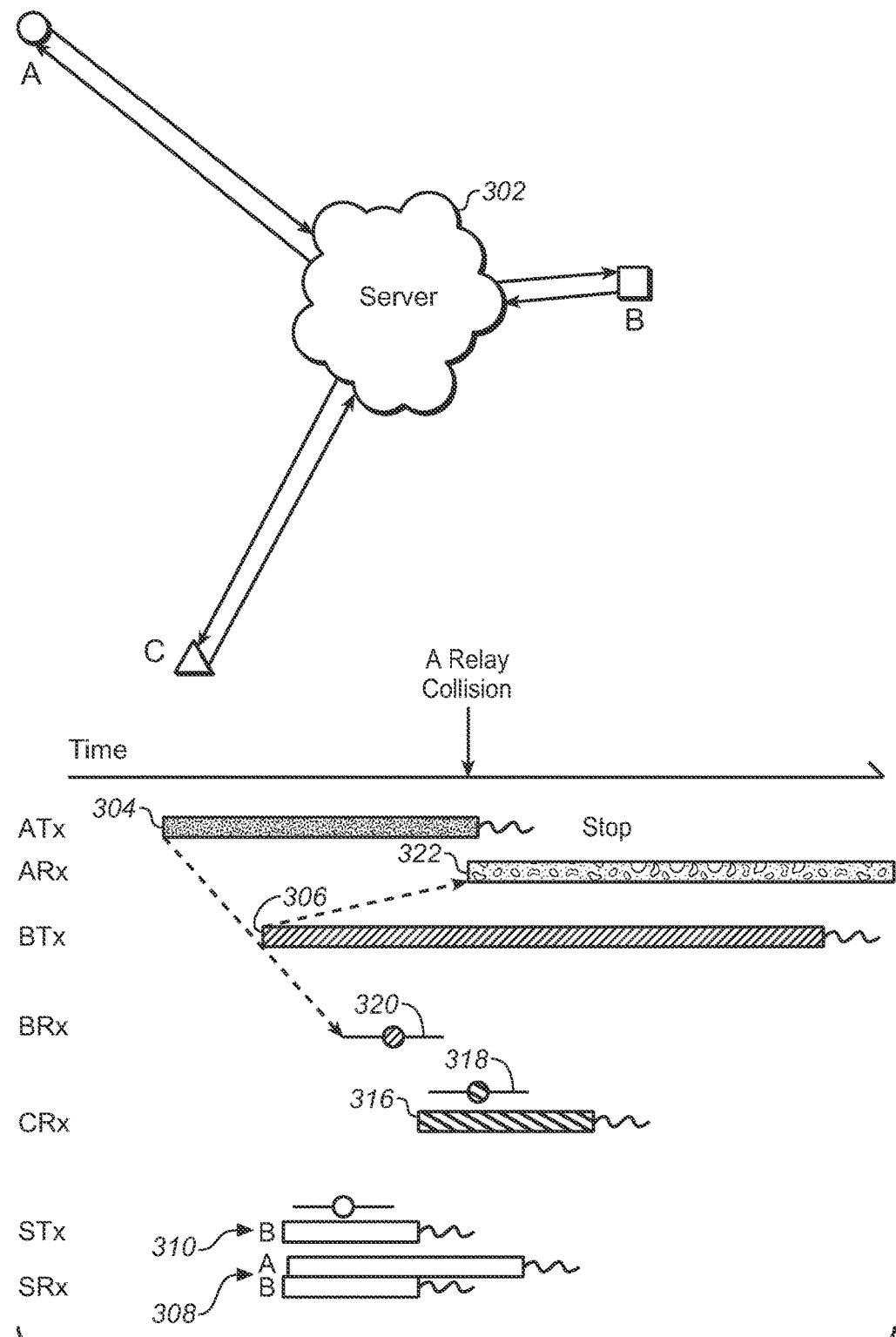
FIG. 3 is a diagrammatic illustration depicting an attenuating approach in a conference system in accordance with certain embodiments.

As mentioned above, in certain embodiments, the subverted party's transmission is not blocked completely by the server, but is attenuated instead. This approach is depicted in FIG. 3. As in the example above, a potential collision condition arises when at 304, A begins a transmission, and then at 306, B begins a subsequent transmission. Again for purposes of discussion, A and B's transmissions, or audio bursts, are considered to be substantially concurrent, even though they begin at slightly different times, and even though the duration of their overlap—that is, their concurrence—may or may not be brief. From the perspective of the server, at SRx, B's transmission is received slightly ahead of A's transmission, at 308. Therefore, from CRx, the server 302 releases B's transmission unaffected, and attenuates A's transmission, at 310. This is evident to C, shown receiving B's unattenuated transmission (316) and A's attenuated transmission (318). B receives A's attenuated transmission at 320, after B has already commenced transmission, at 306. (Conversely, B's transmission, commenced at 306, is received by A unattenuated, at 322, and will cause A to back off). The attenuation of A's transmission provides some indication to B that there has been another attempt to communicate, by A. However, because A's transmission is attenuated, and is not sufficient to cause B to back off in an attempt to resolve the collision. Depending on etiquette, B may continue a short response and query who else was trying to contribute. Notably, the delay due to a pause after collision, and potential secondary collision, is avoided.

The blocking or attenuating approach described above subverts the later-arriving transmission, regardless of path latencies. In this manner the time characteristic of interest is the time of receipt of the audio burst at the server. In some embodiments, a different approach may be taken, for example one that may take into account latencies in the various paths Pa, Pb and Pc, by for example offsetting the calculated times of arrival based on known or measured or estimated path latencies. This would serve to "level the playing field" and provide a more "fair" outcome in the absence of the desire to introduce other manipulation. Offset values can be in the range of 100 to 500 ms, for example. Further, in determining path latencies, it may not be necessary to measure latency for each contending transmission or audio burst. In certain embodiments, a good estimate of path latency can be made based on previous measurements, or based on knowledge of the nature of the path, the components therein, the number of links or hops, the congestion or expected congestion, and so on. In certain embodiments, the latency estimate need not have very fine granularity, and can for instance be in increments of 50 ms or the like. In addition, the determination of onset of transmission may include filtering out or ignoring minor pauses, such as the taking of a breath, in order to accurately gauge a true interruption.

Figure 4:
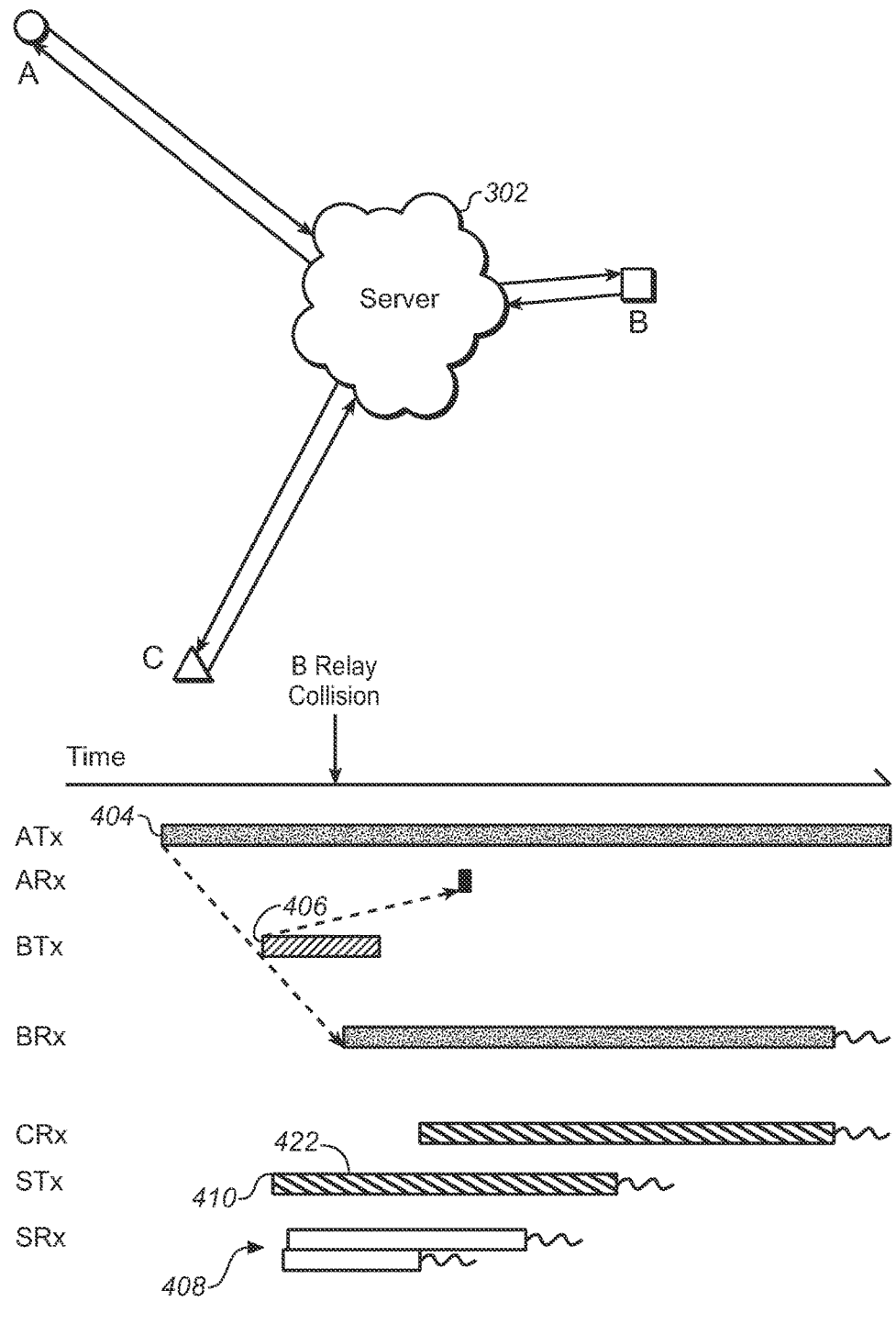
FIG. 4 is a diagrammatic illustration directed towards link latency accounting in accordance with certain embodiments.

FIG. 4 shows a possible approach for taking link latency into account in accordance with certain embodiments. In FIGS. 4, B, for example due to closer proximity to the server, experiences less link latency than A in the conferencing system. A's transmission, commencing at 404, precedes B's (406) in absolute time, but reaches the server after B's transmission, due to link latency, as seen at 408. The server, aware of the latency and A's disadvantage, briefly releases (410) B's transmission, possibly in attenuated form, and then cuts off (blocks or attenuates) B's transmission in favor of A's transmission (412). This cues A that B is also attempting to speak, but the duration of B's cut-off transmission is short and is not sufficient to prevent A from continuing to speak.

Figure 5:
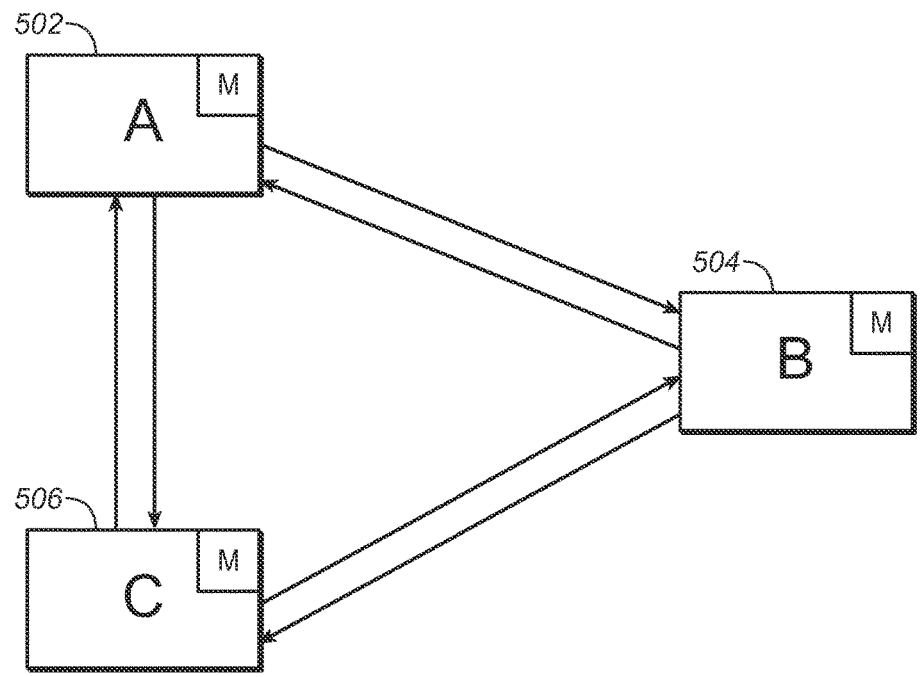
FIG. 5 is a diagrammatic illustration of a peer-to-peer conference system and associated timeline in accordance with certain embodiments.
Figure 5:
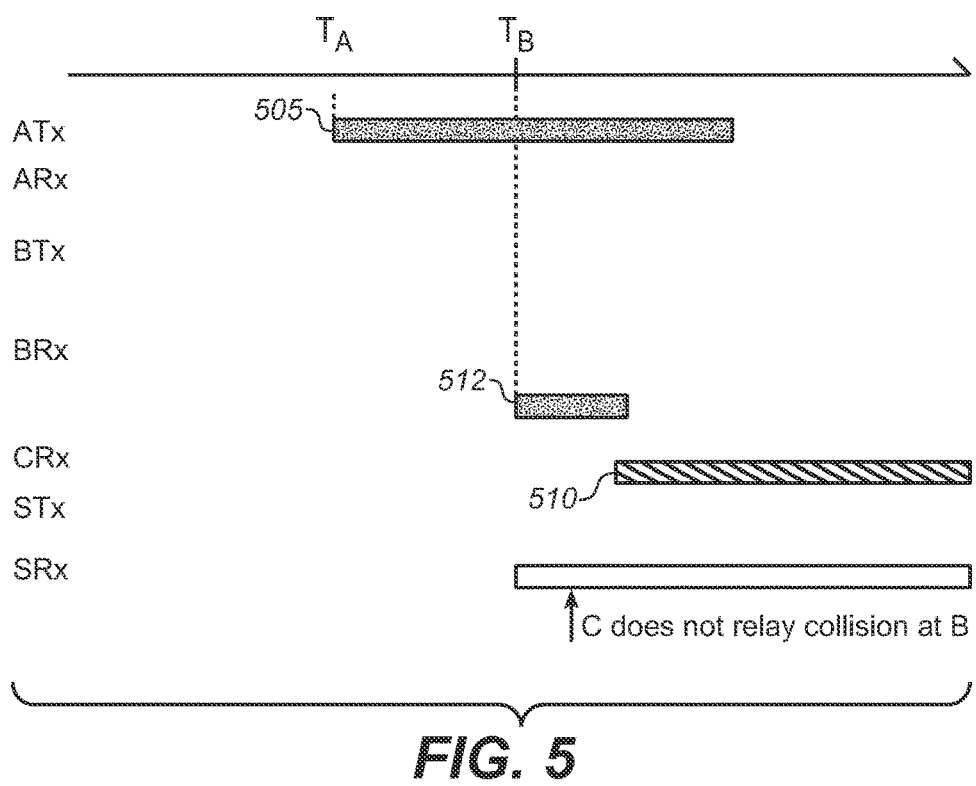

The processes herein described for ameliorating the effect of substantially concurrent audio bursts can be centralized to one or more servers, or they can be distributed over one or more of the communications devices of the various conference participants in a peer-to-peer type arrangement. FIG. 5 is a block diagram of peer-to-peer type arrangement in which three parties communicate directly with one another using communication devices 502, 504 and 506. Each of the communication devices includes a module M configured to perform the selective blocking or attenuating described herein. The modules M can be in the form one or more of hardware, firmware, or software components, or any combination of these, and may be downloadable or otherwise introduced as applications or programs to be run on the various communication devices 502, 504 and 506.

In one embodiment, referred to herein as client-side blocking (although not limited to blocking, as attenuation, or more general forms of "suppression," can also be performed), the time characteristic of interest is a time stamp of an outgoing transmission—that is, the time the speaker commenced talking. This time stamp is compared with a time stamp of an incoming transmission, and the transmission that is deemed to be earlier based on its time stamp is given priority. The time stamps are absolute time stamps, based on synchronized clocks, but latency effects can be taken into account as further detailed herein. Considering Party A at communication device 502, when an outgoing transmission from Party A is perceived to be colliding or potentially colliding with an incoming transmission from Party B (either directly, in the decentralized arrangement, or via the server in the centralized configuration), the communication device 502 compares the time stamps of the two transmissions, and blocks, or attenuates, the later transmission. In certain embodiments, the comparison takes into account the latencies that the transmissions experienced or are expected to experience.

The procedure can also be performed at the other communication devices 504, 506. As long as all the communication devices adhere to the same rule—in this case suppressing, through blocking or attenuation, the later time-stamped transmission—then the outcomes will be consistent for all the parties at the communication devices A, B and C.

Turning to the timeline in FIG. 5, A begins an audio burst transmission 508 at time $T_A$. Because of latency, A's transmission only reaches B at 510. In the meantime, unaware of A's transmission, B begins a transmission 512, at time $T_B$. In this example, if the rule that the modules M in all the communication devices 502, 504, 506 have agreed upon is earlier absolute time prevails, and in this case $T_A<T_B$, then B's transmission will be suppressed (blocked or attenuated). This can manifest in several different implementations. For example, device 504 (B) can suppress its own transmission to device 502 (A) and/or device 506 (C); or device 502 (A) and/or device 506 (C) can suppress B's received transmission, and so on.

It should also be noted that while described with reference to the peer-to-peer type arrangement of FIG. 5, the client-side blocking approach can also be used in conjunction with a centralized configuration such that of FIG. 2, with the server making the determination to subvert transmissions in favor of others based on time stamp comparisons. In addition, a hybrid configuration is contemplated, in which both the clients (party A, B, C communication devices) and the server jointly participate in the suppression decisions, to selectively block or attenuate transmissions from one or more participants.

It may also be possible to provide a turn-taking approach to the parties, with or without accounting for link latencies. In this situation, possibly after link latencies are taken into account, the parties that are allowed to prevail in each contention are rotated so that each party gets a turn in order, or so that the parties each get an equal number of wins over potential interrupters. The goal in this situation can be "fairness." An alternative goal can be the desire to give one or more parties more control or prominence in the conference over others, for example in an organizational hierarchy in which one party, such as a company president or CEO, is to be accorded a favorable bias for his/her transmissions over others. In that case interruptions of that party's transmissions are subverted more often than those of the other parties. It may also be desirable to disfavor one or more participants, so that their transmissions are more often suppressed than others'. These biases can be controlled manually, for example by a moderator, or they can be performed automatically, and can be adjustable over the course of a conferencing session. In certain embodiments, the rule applied relates to a tally of the number of interruptions or attempted interruption by a party is kept, and a bias against that party is imposed, and gradually increased, as the number of interruptions by that party increases.

Figure 6:
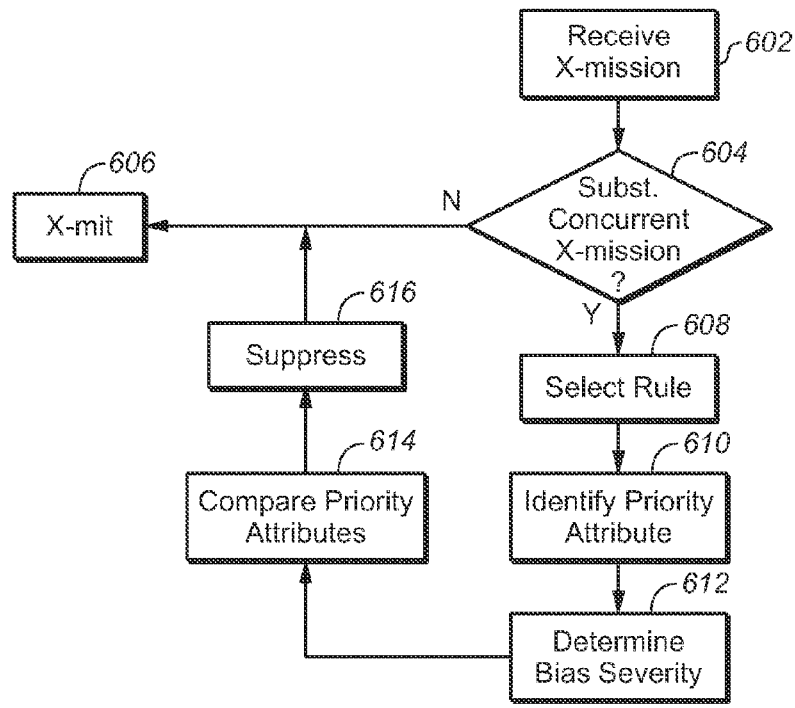
FIG. 6 is a flow diagram showing one approach for mitigating the effects of substantially concurrent audio bursts in accordance with certain embodiments.

FIG. 6 is a flow diagram of a process 600 that is performed by the server and/or a combination of one or more of the communication devices in order to ameliorate the effect of substantially concurrent audio bursts in an audio conferencing context in accordance with one embodiment. The flow as depicted in FIG. 6 begins with the reception of a transmissions (audio burst for example), at 602. A determination is made, at 604, of whether there is a substantially concurrent audio burst. If not, then the solitary audio burst is transmitted (or played back, depending on whether the decision is made locally or at the centralized server), at 606. If there is a substantially concurrent audio burst in the conferencing space, then a rule selection is made, at 608. In certain embodiments, the rule selection may have already been made, prior to the collision, or it may be simply hard-wired or pre-programmed into the system. Example rules are first-to-speak, turn-taking/fairness, preferential treatment to one or more parties, disfavorable treatment for one or more parties, or a combination of one or more of these. At 610, a priority attribute of each of the concurrent audio bursts is identified. The priority attribute of the audio burst can for example relate to a time characteristic, such as the time of initial utterance of the audio burst; time of receipt of the audio burst at a particular device, such as the conferencing server and/or one or more of the communication devices. The priority attribute can also relate to the identity of the speaker of the audio burst, either through machine recognition of the speaker's voice or through other information such as knowledge of the communication device associated with the speaker or the input of a speaker-code, by the speaker or on behalf of the speaker. The priority attribute can also relate to a tally of the number of interruptions by speaker of the audio burst, so that as that tally increases, a bias against that speaker can imposed or increased.

In addition to selecting which of the rules is or are to be followed, in certain embodiments, a selection of the extent or the severity to which the rules are to be applied can be made, as shown in 612. For example, when biasing in favor of a particular speaker, a ratio of the number of times that that speaker should prevail over other speakers can be adjusted—for example, three out of four interruptions should be resolved in his/her favor. The ratio or other biasing factor can be preset or it can be adjustable for each session, or even dynamically adjustable during a single session, manually or automatically. The selected rule is then implemented, for example by comparing, at 614, the priority attributes of the contending audio bursts. In the first-to-speak example, time stamps of the competing bursts are compared, taking account of path latencies and severity bias (from 612), and the later audio burst is suppressed (516) with respect to one or more participants. In the preferential treatment approach, the identity of the speakers is compared, and audio bursts from speakers that are not designated to receive preferential treatment are suppressed with respect to one or more participants. The prevailing audio burst is then transmitted or played back, at 606.

Figure 7:
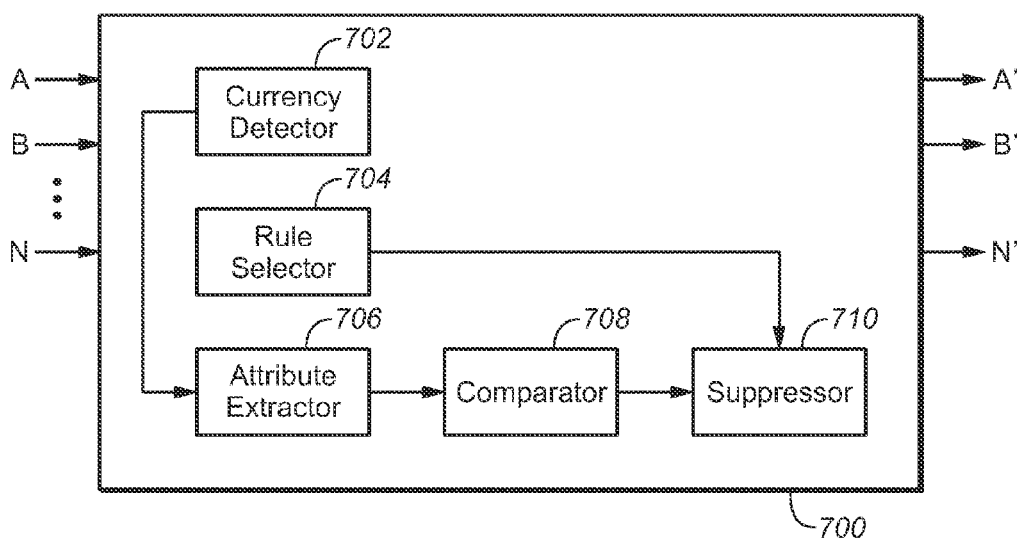
FIG. 7 is a block diagram of a system operable to ameliorate the effect of substantially concurrent audio bursts in accordance with certain embodiments.

FIG. 7 is a block diagram of a system 700 operable to ameliorate the effect of substantially concurrent audio bursts in accordance with certain embodiments. A concurrency detector 702 determines which of a plurality of transmissions from parties A-N are substantially concurrent. A rule selector 704 selects one or more rules to apply to the substantially concurrent transmissions. An attribute extractor 706 extracts priority attributes necessary to implement the selected rule(s). A priority attribute comparator 708 then compares the priority attributes of the substantially concurrent transmissions. A suppressor 710 suppresses one or more of the transmissions selectively with respect to the other parties. The system 700 then outputs transmissions A'-N' in which zero or more of the transmissions has been suppressed with respect to one or more of the other parties. It will be appreciated that the system 700 can be of the centralized server type arrangement or the distributed peer-to-peer arrangement, or a combination of these. Further, each of the blocks described therein may be a free-standing software and/or hardware module, or it may be part of a combination of other such blocks illustrated and described separately for convenience only. Other blocks or functionalities may also be part of system 700, even though not expressly described herein.

It will be appreciated that while embodiments of the invention are described with respect to audio bursts and transmissions, the invention is not so limited. Audio is an important element of much interactive communications, and furthermore, it is the audio signaling and cues that often dominate the flow and conversational turn taking of a mediated assemblage. As explained above, the prevalence of 'stutter' or breaking of conversational flow that arises from two or more parties becoming aware of a contention around timing for their contribution is an undesirable manifestation of system latency. Audio and the speech communication are both a valuable part of this process as they are the modality that is useful for signaling and the indication of communication or the attempt to enter or contribute to an interactive meeting. However, in telecommunication and interactive systems, there may be additional data and sensory modes represented in the mediated communications system. A notable example is video. In certain embodiments, the processing described herein can be extended to video streams, for example those accompanying the audio in a videoconference. The video stream can be similarly modified between parties to retain consistency with the audio, and provide an additional obfuscation of the collision events between contributing parties. In some embodiments, the decision framework is completely dependent on the audio components and signaling, with some video processing applied to modify the presented streams such that at least one party has a different impression of the present meeting dynamics with regard to turn taking and interruption. In such embodiments, for example, the party selected as a preferred participant at one time of an identified collision receives both a modified audio stream, to be less aware of a competing participant, and also receive a modified video stream, such that no distracting visual cues are presented. In such embodiments, the video modification is envisaged as an additional step to assist in the confident and effective input from a preferred participant.

In certain embodiments, additional sensory input, such as video or even some direct human interface, that is designed to provide an indication of the intention or action of contribution to the interactive conference, could be used. For example, video analysis may take advantage of precursor events that help to predict the commencement of verbal contribution. Examples considered in some embodiments include visual signals such as weight shifting, leaning forward, opening of the mouth, rubbing of the forehead, and many other known physiological indications of preparation to present or interact. Additional inputs and context may include such aspects as toggling a device mute, hand gestures to other parties, analysis of breathing and larger movements of the body through tactile, haptic and positional sensing.

Embodiments of the invention relate to audio-visual communication over a distance, for direct human receipt and consumption in order to mediate the interaction. In certain embodiments, an analysis and logging of the information may also be performed. Thus certain embodiments aim to manage a distributed resource, relating to the relative mind state of each participant regarding their authority and permission to be a priority contributor to the meeting for a period of time without pause or interruption. The distributed resource in this case is that of thinking, deciding or being encouraged that it is at present 'their turn', relying on the concept of mediating and managing the distributed perception of 'turn' around data and interaction that is primarily for direct human sensory input.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

The invention claimed is:

1. A method for mitigating the effects of concurrent audio bursts from two or more participants in a conference system, in which a plurality of communication devices electronically connect the participants to one another, the method comprising:
    identifying a priority attribute associated with each of multiple concurrent audio bursts;
    comparing the identified priority attributes; and
    electronically and automatically suppressing at least one of the concurrent audio bursts as a function of the comparison, wherein said suppressing comprises performing one or more of attenuating, altering pitch, sound replacement, selective frequency manipulation, or selective spatial positioning, wherein said suppressing includes selectively suppressing perception of the audio burst by less than the total number of participants,
    wherein the conferencing system is implemented at least in part with hardware.

2. The method of claim 1, wherein the priority attribute relates to time of receipt of the audio burst at an audio conferencing server.

3. The method of claim 1, wherein the priority attribute relates to time of receipt of the audio burst at a communication device.

4. The method of claim 1, wherein the priority attribute relates to time of utterance of the audio burst.

5. The method of claim 1, wherein the priority attribute relates to speaker identity.

6. The method of claim 1, further comprising determining a latency associated with each audio burst, said comparing including accounting for determined latencies.

7. The method of claim 6, wherein determining a latency associated with each audio burst comprises obtaining an estimate of path latency based on one or more of previous measurement, knowledge of path length, path components, number of path links or hops, and congestion or expected congestion.

8. The method of claim 1, wherein said suppressing is conducted in accordance with one or more rules selected from first-to-speak, turn-taking/fairness, preferential treatment to one or more parties, disfavorable treatment for one or more parties, and interruption tally.

9. A conferencing system operable to mitigate the effects of two or more substantially concurrent audio bursts, comprising:
    a concurrency detector that determines concurrency of two or more audio bursts;
    an attribute extractor that extracts priority attributes from concurrent audio bursts;
    a comparator that compares extracted priority attributes; and
    a suppressor that electronically and automatically suppresses at least one of the two or more concurrent audio bursts as a function of the comparison, wherein the suppressor performs on said at least one audio burst one or more of attenuating, altering pitch, sound replacement, selective frequency manipulation, or selective spatial positioning, wherein the suppressor selectively suppresses perception of the audio burst by less than the total number of participants,
    wherein the conferencing system is implemented at least in part with hardware.

10. The conferencing system of claim 9, wherein the priority attributes relate to time of receipt of the audio burst at an audio conferencing server.

11. The conferencing system of claim 9, wherein the priority attributes relate to time of receipt of the audio burst at a communication device.

12. The conferencing system of claim 9, wherein the priority attributes relate to time of utterance of the audio burst.

13. The conferencing system of claim 9, wherein the priority attributes relate to speaker identity.

14. The conferencing system of claim 9, wherein the comparator accounts for audio burst latency.

15. The conferencing system of claim 14, wherein the latency comprises an estimate based on one or more of previous measurement, knowledge of path length, path components, number of path links or hops, and congestion or expected congestion.

16. The conferencing system of claim 9, further comprising a rule selector that selects one or more rules selected from first-to-speak, turn-taking/fairness, preferential treatment to one or more parties, disfavorable treatment for one or more parties, and interruption tally, wherein the suppressor suppresses said at least one audio burst in accordance with said selected one or more rules.

17. The conferencing system of claim 9, wherein the suppressor enhances at least one different audio burst.

18. The conferencing system of claim 17, wherein the suppressor enhances said at least one different audio burst by increasing a gain or spatial shifting of the different audio burst.

19. The method of claim 1, wherein suppressing the at least one audio burst comprises enhancing at least one different audio burst.

20. The method of claim 19, wherein enhancing at least one different audio burst comprises increasing gain and/or spatial shifting.

* * * * *